(12) United States Patent
Mishra et al.

(10) Patent No.: US 9,235,866 B2
(45) Date of Patent: Jan. 12, 2016

(54) ANALYZING SOCIAL NETWORK

(71) Applicant: Tata Consultancy Services Limited, Mumbai, Maharashtra (IN)

(72) Inventors: Pratik Kumar Mishra, Chennai (IN); Dinesh Pothineni, Chennai (IN); Aadil Rasheed, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 225 days.

(21) Appl. No.: 14/104,257

(22) Filed: Dec. 12, 2013

(65) Prior Publication Data

US 2014/0164300 A1    Jun. 12, 2014

(30) Foreign Application Priority Data

Dec. 12, 2012    (IN) .......................... 3498/MUM/2012

(51) Int. Cl.
*G06N 99/00*    (2010.01)
*G06Q 50/00*    (2012.01)

(52) U.S. Cl.
CPC ................ *G06Q 50/01* (2013.01); *G06N 99/00* (2013.01)

(58) Field of Classification Search
CPC ............................. G06N 99/00; G06Q 50/01
See application file for complete search history.

(56) References Cited

U.S. PATENT DOCUMENTS

2006/0015588 A1*   1/2006  Achlioptas ............. G06Q 30/02
                                                             709/220
2012/0124134 A1*   5/2012  Dey ........................ G06Q 50/01
                                                             709/204
2012/0137367 A1    5/2012  Dupont et al.

FOREIGN PATENT DOCUMENTS

WO    WO2010099631 A1    9/2010

OTHER PUBLICATIONS

Social Thermodynamics, by Pothineni, published Dec. 14, 2012.*
Thermodynamics of urban population flows, by Hernando, published 2012.*
Thermodynamics in Social Perspective, by Fourie, published 1981.*
Huan-Kai Peng; Ying Zhang; Peter Pirolli; Tad Hogg, "Thermodynamic Principles in Social Collaborations" Proceedings, CI 2012.
Mohsen Mohsen-Nia, Thermodynamic Research Laboratory, University of Kashan, Kashan, Iran;, "Social Equation of State" Journal of Human Thermodynamics, 2013, vol. 9.
Adriaan De Lange (2001), South African Chemical Physicist, "Human Thermodynamics Fundamentals".

* cited by examiner

*Primary Examiner* — Jeffrey A Gaffin
*Assistant Examiner* — Thomas Fink
(74) *Attorney, Agent, or Firm* — Hayes Soloway PC

(57) ABSTRACT

Disclosed is a method and system for analyzing a social network, the method comprising: segregating, by a processor, the social network into a plurality of groups of users, wherein each group of users has a unique identity in the social network; mining, by the processor, data from a group of users of the plurality of groups of users; identifying a plurality of social variables from the data, wherein the plurality of social variables comprises at least one of a number of users, connections of the users, interactions of the users, affinity of the users, or posts by the users; equating a social variable of the plurality of social variables with a thermodynamic variable of a plurality of thermodynamic variables; determining quantitative values of the plurality of thermodynamic variables based upon the plurality of social variables; generating a virtual thermodynamics system based upon the quantitative values for analyzing the social network.

15 Claims, 5 Drawing Sheets

Change in Pressure "P" of the macro-state vs. volume "V"

ANALYZING SOCIAL NETWORK

CROSS REFERENCE TO RELATED APPLICATION

The present application claims priority from Indian Provisional Patent Application No. 3498/MUM/2012, filed on Dec. 12, 2012, the entirety of which is hereby incorporated by reference.

TECHNICAL FIELD

The present subject matter described herein, in general, relates to data analysis in a social network.

BACKGROUND

Social networks such as Facebook®, Twitter®, Foursquare®, Linkedin® have been able to attract millions of users. These users have enrolled on the social networks and perform a variety of activities such as sharing information, making groups, connecting with people, posting comments, sharing feelings, and the like. There are millions of activities being performed on these social networks every day. The activities, preferences, habits, and demographic profile of the users may be mined as data from these social networks. It must be understood that the data mined or fetched from the social network may be of different types, and/or may relate to contextual behavior of a community or group of users. Analyzing the data is a complex task as there is a complex relationship among the data.

In order to analyze the data, several complex algorithms may be required for comprehending relationships among data. It is further cumbersome to derive conclusions based upon the analysis of the data due to uncertainty in the behavior of the users and ever changing trends in the social network. The data may be analyzed for performing business related activities in the social network. The business related activities may include advertizing or promoting a product or a service in the social network.

SUMMARY

This summary is provided to introduce concepts related to systems and methods for generating a virtual thermodynamic system based upon a social network and the concepts are further described below in the detailed description. This summary is not intended to identify essential features of the claimed subject matter nor is it intended for use in determining or limiting the scope of the claimed subject matter.

In one implementation, disclosed is a method and system for analyzing a social network, the method comprising: segregating, by a processor, the social network into a plurality of groups of users, wherein each group of users has a unique identity in the social network; mining, by the processor, data from a group of users of the plurality of groups of users; identifying a plurality of social variables from the data, wherein the plurality of social variables comprises at least one of a number of users, connections of the users, interactions of the users, affinity of the users, or posts by the users; equating a social variable of the plurality of social variables with a thermodynamic variable of a plurality of thermodynamic variables, wherein the plurality of thermodynamic variables comprises at least one of molecules, volume, internal energy, pressure, temperature, entropy, mass, viscosity, density, work, and bonding between molecules; determining quantitative values of the plurality of thermodynamic variables based upon the plurality of social variables, wherein the quantitative values are determined by controlling one or more thermal states; generating a virtual thermodynamics system based upon the quantitative values for analyzing the social network, wherein the virtual thermodynamics system is analogous to the social network.

Further, disclosed is a computer program product having embodied thereon a computer program for analyzing a social network, the computer program product comprising: program code for segregating the social network into a plurality of groups of users, wherein each group of users has a unique identity in the social network; mining, by the processor, data from a group of users of the plurality of groups of users; identifying a plurality of social variables from the data, wherein the plurality of social variables comprises at least one of a number of users, connections of the users, interactions of the users, affinity of the users, or posts by the users; equating a social variable of the plurality of social variables with a thermodynamic variable of a plurality of thermodynamic variables, wherein the plurality of thermodynamic variables comprises at least one of molecules, volume, internal energy, pressure, temperature, entropy, mass, viscosity, density, work, and bonding between molecules; determining quantitative values of the plurality of thermodynamic variables based upon the plurality of social variables, wherein the quantitative values are determined by controlling one or more thermal states; generating a virtual thermodynamics system based upon the quantitative values for analyzing the social network, wherein the virtual thermodynamics system is analogous to the social network.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present invention discloses a system and method for analyzing a social network. While aspects of described system and method for analyzing a social network may be implemented in any number of different computing systems, environments, and/or configurations, the embodiments are described in the context of the following exemplary system.

Figure 1:
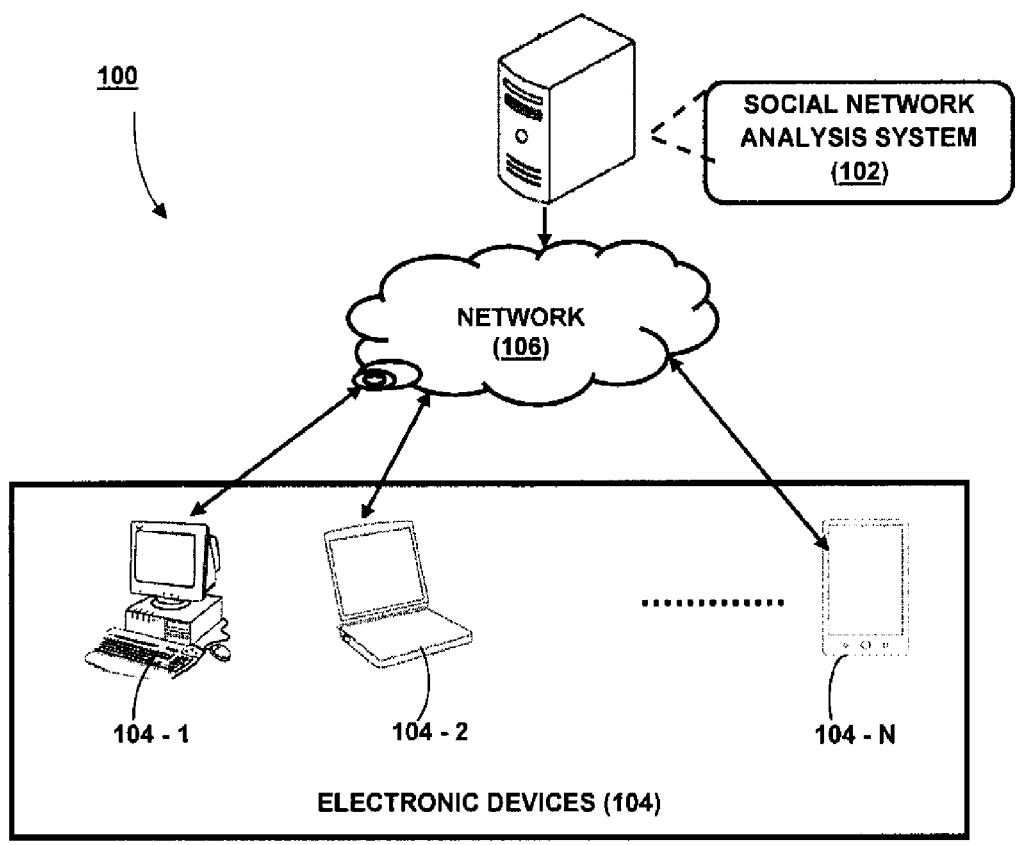
FIG. 1 illustrates a network implementation of a social network analysis system for analyzing a social network is disclosed, in accordance with an embodiment of the present subject matter.

Referring now to FIG. 1, a network implementation 100 of a Social Network Analysis System (SNAS) 102 for analyzing a social network is illustrated, in accordance with an embodiment of the present subject matter. Examples of a social network may include Facebook®, Twitter®, Foursquare®, Linkedin® and the like.

Although the present subject matter is explained considering that the social network analysis system 102 is implemented on a server, it may be understood that the social network analysis system 102 may also be implemented in a variety of computing systems, such as a laptop computer, a desktop computer, a notebook, a workstation, a mainframe computer, a server, a network server, and the like. In one implementation, the SNAS 102 may be implemented in a cloud-based environment. It will be understood that the SNAS 102 may be accessed by users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the social network analysis system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
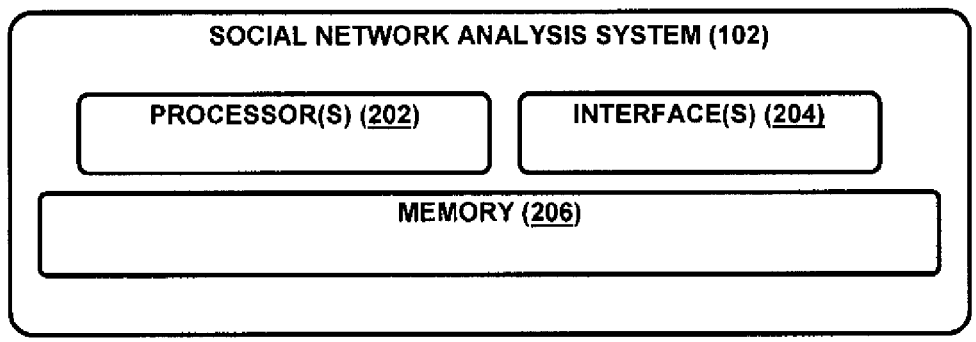
FIG. 2 illustrates the social network analysis system of FIG. 1, in accordance with an embodiment of the present subject matter.
Figure 3:
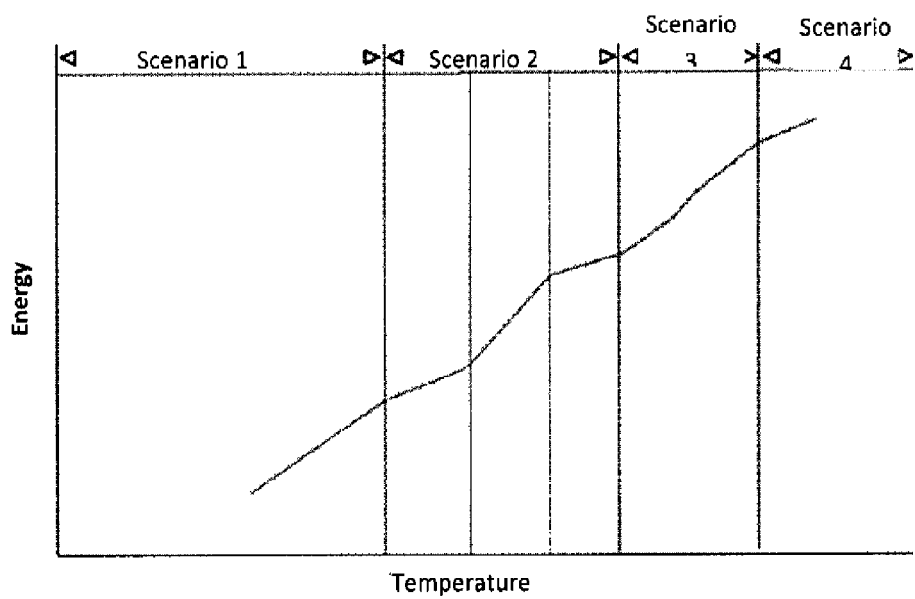
FIG. 3 illustrates a graphical representation of the variation in energy with respect to temperature in the social network, in accordance with an embodiment of the present subject matter.
Figure 4:
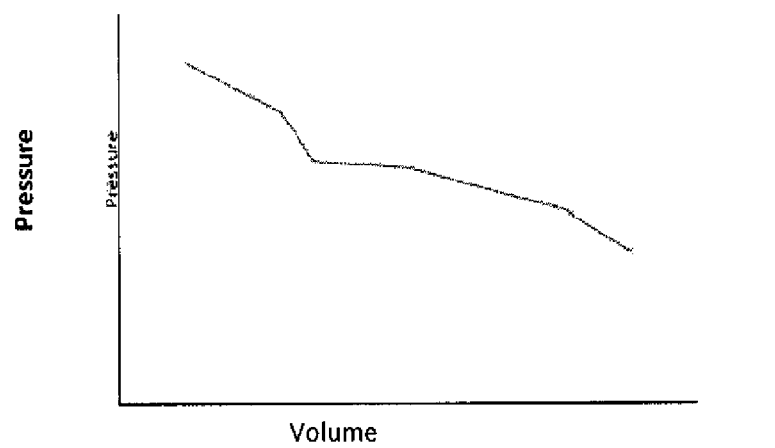
FIG. 4 illustrates a graphical representation of the variation in pressure with respect to volume in the social network, in accordance with an embodiment of the present subject matter.

Referring now to FIG. 2, the social network analysis system 102 is illustrated in accordance with an embodiment of the present subject matter. In one embodiment, the social network analysis system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the SNAS 102 to interact with a user directly or through the client devices 104. Further, the I/O interface 204 may enable the social network analysis system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules. The modules include routines, program instructions, objects, components, data structures, etc., which perform particular tasks, functions or implement particular abstract data types. The modules are executed by the processor to perform functions of the SNAS 102.

In one implementation, in order to analyze the social network, the social network analysis system 102, at first, may segregate the social network into a plurality of groups of users. The groups of users may be understood as sub-networks or sub-systems in the social network. The segregation may be performed based upon a unique identity/feature possessed by each group in the social network. For example, users in an age group of 18-21 may be segregated in group G1; users of New Delhi may be segregated in group G2; users supporting a particular political party may be segregated in group G3, users supporting or endorsing a particular product may be segregated in group G4; users having similar qualification may be segregated in group G5; similarly the entire social network may be segregated into subsystems/groups/sub-network based upon a unique quality/feature of the group.

Post segregation of the social network, the processor 202 may mine or fetch data of one or more groups from the social network. The data may be mined using data mining techniques known in the art. It is to be understood that the data is mined for each group separately. In one example, the data may be mined from the group G1. After mining the data from the group G1, the processor 202 may identify a set of social variables from the data. In one embodiment, the set of social variables may include a number of users in the group G1, connections between of the users of the group G1, interactions of the users of the group G1, affinity of the users of the group G1, and posts/comments by the users of the group G1, blogs or write-ups by users of the group G1, profile info of the users of the group G1, sharing habits of the users of the group G1, and the like. Similarly, data may be mined for other groups, such as groups G2, G3, G4, and so on.

After mining the data for one or more groups present in the social network, the processor 202 may equate a social variable of the plurality of social variables of the group G1 with a thermodynamic variable of a plurality of thermodynamic variables. The plurality of thermodynamic variables may include at least one of molecules, internal energy, pressure, temperature, entropy, volume, mass, viscosity, density, work, and bonding between molecules. Equating the social variables with the thermodynamic variables may mean analogizing the Molecules with the number of people; the Volume with the connections between the users; the Internal Energy with the interactions between the users; the Entropy with a number of possible states in which the users can exist; the Work with an effort done by force in changing the state of the social network; and so on. In this way, social variables may be equalized with thermodynamic variables.

In order to understand a relation between the social variables and the thermodynamic variables, a following example may be considered. In this example, the group G1, having users in the age group of 18-21, may be focused upon. After the data of the group G1 is mined, it may be concluded that the number of users in group G1 are 1000; the connections of the users of the group G1 are 50000, the interactions of the users of the group G1 are 1 million, and the posts/comments by the users of the group G1 are 25000, the blogs by the users of the group G1 are 5000, and the like. In this way, quantitative values of all the social variables may be determined. From the quantitative values of the social variables, it may be determined that the number of molecules in the social network are 1000 as molecules is equal to number of users; the volume of the social network is 50000 cubic centimeter (cc) as volume is equal to number of connections; the internal energy of the social network is 1 million Joules (J) as internal energy is equal to number of interactions. It must be understood that as and when the plurality of social variables change in the social network, values of corresponding thermodynamic variables also get changed.

Therefore, it may be understood that a resemblance between the social network and the virtual thermodynamic network may be created by equating the social variables with the thermodynamics variables. Interaction of users with one another, exchange emotions and opinions affecting the way other users steer constantly, suggests an existence of internal energy being transferred from one user to another in the social network. Therefore, it may be fair to conclude that social networks possess internal energy in some form and constantly try to reach an equilibrium state.

Although, values of certain thermodynamic variables may be directly determined from the values of the social variables, other thermodynamic variables may have to be derived. For example, the entropy of the social network, the pressure in the social network, the temperature of the social network, the change in internal energy in the social network and the like may be determined by applying certain thermodynamic principles. In one embodiment, these thermodynamic variables may require controlling thermal states of the social network. The thermal states may be controlled based upon thermodynamics principles known in the art. Examples of thermal states may include adiabatic compression, isochoric heating, adiabatic cooling, and isochoric cooling. In this embodiment, a thermal system profoundly used in automobiles "Otto Cycle" is considered as a closest analogous process which involves four phases namely 1) Adiabatic compression: Work done increases the temperature without dissipating heat; 2) Isochoric heating: Heat supplied at constant pressure raises the temperature; 3) Adiabatic cooling: drastic decrease in pressure results in heat loss; 4) Isochoric cooling: sudden decrease in temperature at constant volume due to heat loss. The isochoric heating and adiabatic cooling are modeled and mapped to the social network system as in "Otto-cycle.

Case 1

Isochoric Heating

In one embodiment, isochoric heating is considered in order to calculate pressure under the condition: (N—users, V—volume|connections). In this case, the isochoric heating of the social network may be performed when the social network reaches a maturity of volume by forming enough connections, after which the social network gets heated up by interactions happening due to various external influences. At this point, the social network adheres to a condition (V is constant, $\Delta V=0$) making it feasible to calculate Temporal Pressure, Temperature, and Change in Internal Energy over time.

According to ideal gas law equation, pressure "P" time's volume "V" equals to number of moles "n" times gas constant "R" and temperature "T", i.e., $$PV=nRT \quad (1)$$

However, equation (1) may not be considered synchronous with the social network because it is quite hard to rely on number of moles which is an ambiguous undefined unit in social context. Therefore, another equation may be considered, i.e., $$PV=NK_BT=nRT \quad (2)$$

Universal Boltzmann constant $K_B$ may be relied on, while holding the same thermodynamics variables that are needed. Instead of moles, the number of molecules (N) is placed on the right side of equation (2), which accounts for density of gas i.e., number of particles per volume. Further, in Isochoric heating, Volume becomes constant when the social network stops expanding after reaching a maturity level, i.e., $$P\alpha T; \text{where } V \text{ is constant} \quad (3)$$

Further, the pressure and the energy density are not same but related. When $K_BT$ is considered i.e., the kinetic energy density of gas, it appears same in a first glance. However, when looked closely, pressure is momentum flux applied in spatial direction while energy corresponds to temporal direction, i.e., $$T=Q/S \quad (4)$$

Considering a relation between Temperature, heat, and entropy in the equation (4), it may be derived that a thermodynamics system in which entropy is an independent externally measured variable, temperature may be defined as derivative of the internal energy with respect to the entropy, i.e., $$Q_{heat}=U_{internal\ Energy}+W_{work\ done} \quad (5)$$

While work done is zero, $\Delta V=0$ $$T=dU/dS \quad (6)$$

Heat $\Delta Q=\Delta U$ (change in internal energy as new interactions get created and the information flows)

$$\Delta Q=\Sigma \lambda_i N_i I_i \quad (7)$$

$\lambda_i$ is a social coefficient.

Every interaction between the users of the social network does not carry equal energy and varies on interaction type. This may be referred to as a social network dependent variable i.e., the Social Coefficient $\lambda_i$.

$N_i$—Number of users involved in an interaction and depends upon a type of interaction, group message, share, comment, and the like $V_y$—Subjective volume based on my connections Iz—change in interactions Further, as per a physical equation of entropy:

$$S=K_s \ln(\Omega(N,V,U)) \quad (8)$$

Where S is entropy of the social network.

The thermodynamic variables $\Omega$ (N, V, U, X . . . ) used in equation (8) may comprises one or more thermodynamics variables that may alter during an experiment. Equation (8) may be helpful as otherwise, as it can be observed that decline in entropy which is again paradox to the property of entropy. Any new information that is being infused into the social network is some sort of interaction between the users. These interactions are responsible for energy addition into the social network. Similar to photons, these interactions have negligible mass but are responsible for energizing the social network in every possible way, thus affecting communication dynamics of the social network.

People or users are molecules who emit energy in terms of interactions, whereas connections between the users are similar to pipes which constitute for actual volume. With increase in users, energy increases. Assumption is that all pipes are of the same volume with equal ability to transfer information, where in reality, with increase in affinity between the users, the volume of pipe (i.e., a probability of information passing from one end to end) may increase. Ideally strong ties and weak ties should be factored in future models, as users alone do not matter without a bridge between them. In other words an isolated molecule cannot affect the social network in any way.

In ideal scenario, molecules gain energy from the heat generated in the social network. Some form of potential energy which affects the social affinities between connected molecules and in turn diffusion of data exists, i.e., $$\text{Work}=pdV \quad (9)$$

work done=0 in this case.

Case 2

Adiabatic Cooling

Adiabatic thermodynamic process does not allow heat transfer between system and surrounding. It is mostly an abrupt event, with not enough time to facilitate heat exchange. Free expansion is a process of expansion in vacuum, which in social network corresponds to users making connections in absence of external pressure. It can be triggered with the arrival of an influential user, creating a huge impulse in the social network. Despite arrival of an external user, network may still be considered close because of negligible impact on number of users, when the number is high. Impulse generated sets the social network in a state of abrupt expansion in the absence of external pressure. Change in internal energy is ignored as there is probability of new interactions in this short-span of time is negligible.

$$\Delta H=\Delta U+\Delta W \quad (10)$$

$$\Delta H=\Delta W\{\text{as }\Delta U=0\} \quad (11)$$

The entire process is irreversible, as the social network goes into free expansion there is an abrupt variation in the pressure across the social network with sudden dip in entropy and volume. So, the quantification of thermodynamics variables is infeasible.

Generating Virtual Thermodynamics System

It may be understood that after determining quantitative values of the plurality of thermodynamic variables based upon the plurality of social variables and based upon the one or more thermal states, the processor may generate a virtual thermodynamics system. Specifically, the virtual thermodynamics system may be generated based upon the quantitative values of the thermodynamic variables. The virtual thermodynamics system (VTS) is analogous to the social network and may be used for analyzing the social network. In one example, if the Internal Energy of the social network/VTS is high in a particular group, then a person may use the high Internal Energy of that group for diffusing relevant information recursively in that particular group. Diffusing the relevant information may mean spreading advertising campaigns in the group of users, channeling cellular data in the group of users, spreading political and social movements in the group of users, spreading news in the group of users, and identifying pressure zones in the group of users. In one example, the relevant information may be indicative of information about a product or service offered by a business person, wherein the product or service may be of interest to users in the group. The relevant information may be diffused recursively for a predefined time period and may terminate thereafter.

Based upon the reaction of the users of group G1 on the relevant information, an influential analysis may be performed in the social network. In one embodiment, the influential analysis may be performed by collating an effect of diffusion of the relevant information in more than one group. In other words, influential analysis is a holistic view of a portion or entire social network to understand the effect of relevant information on the groups defined in the social network.

In another embodiment, the influential analysis may be performed considering the viscosity in the social network. Viscosity may be understood as a resistance exhibited by a user or group or groups to let an information pass through it. For example, Iphone® fans in a group X would be happy to share anything positive about Apple®, but may not be willing to do so for Ford Motors®. In other words, people of group X are to Ford Motors®. In this example, Apple® is an influencer. To put it straight, the system 102 measures a decrease in viscosity in group(s) due to change in state of an influential user/group.

Method Flowchart

Figure 5:
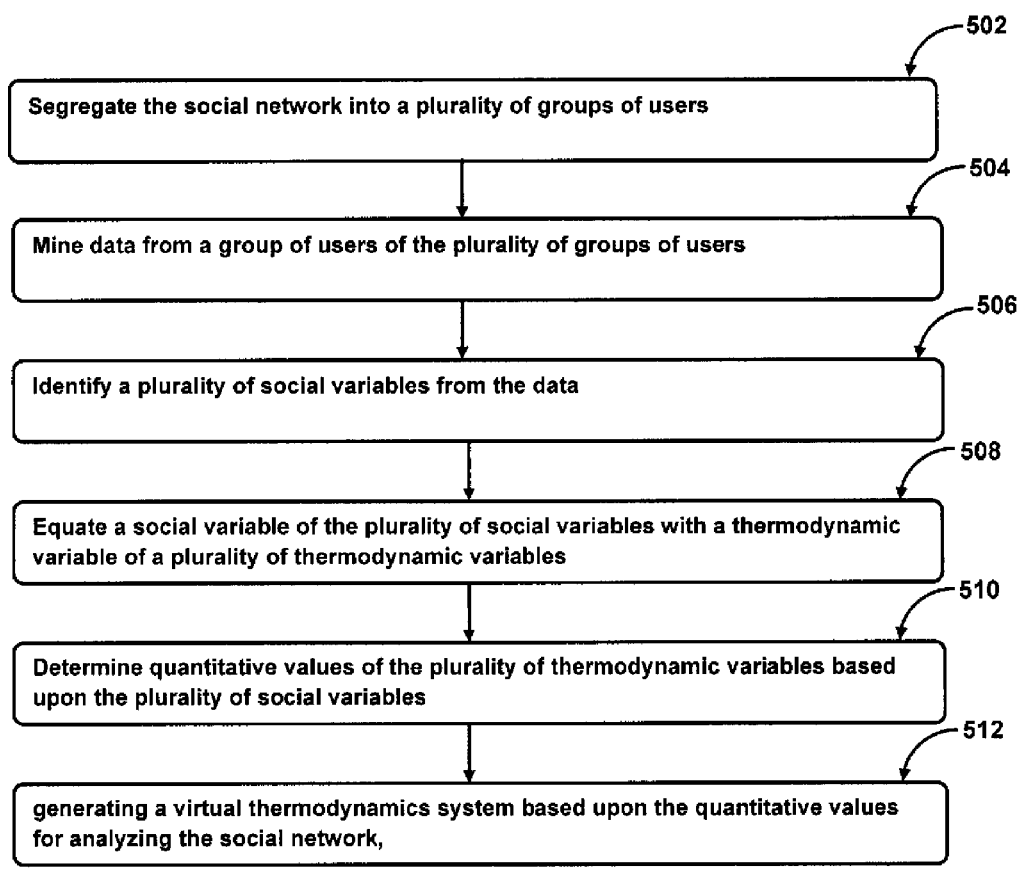
FIG. 5 illustrates a method for analyzing a social network, in accordance with an embodiment of the present subject matter.

Referring now to FIG. 5, a method 500 for analyzing a social network is shown, in accordance with an embodiment of the present subject matter. The method 500 may be described in the general context of computer executable instructions and is performed by the processor 202. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented in the above described system 102.

At block 502, the social network may be segregated into a plurality of groups of users. Each group of users has a unique identity in the social network.

At block 504, data of a group of users of the plurality of groups of users may be mined from the social network.

At block 506, a plurality of social variables may be identified from the data. The plurality of social variables comprises at least one of a number of users, connections of the users, interactions of the users, affinity of the users, or posts by the users.

At block 508, a social variable of the plurality of social variables may be equated with a thermodynamic variable of a plurality of thermodynamic variables. The plurality of thermodynamic variables comprises at least one of molecules, volume, internal energy, pressure, temperature, entropy, mass, viscosity, density, work, and bonding between molecules;

At block 510, quantitative values of the plurality of thermodynamic variables may be determined based upon the plurality of social variables. The quantitative values are determined by controlling one or more thermal states such as adiabatic compression, isochoric heating, adiabatic cooling, and isochoric cooling.

At block 512, a virtual thermodynamics system may be generated based upon the quantitative values for analyzing the social network. The virtual thermodynamics system is analogous to the social network.

A Working Example

The system and the method have been tested on a social network connecting 250K users. The considered social network is an emerging network with about 877 Million recognized connections since its establishment. The historical data for the duration of 6 months is considered for analysis. In order to simulate the appropriate environment for the experiments, mature connections that undergo minimal changes are selected and the budding connection in the networks is ignored. These set of connections and connected users represent a macro-state. For these macro-states the volume (V) remains constant as there is no new connections being developed and it can be considered as an isochoric socio-thermodynamic process.

In one exemplary embodiment invention, the scheduling started by isolating the network from the other interfering data. The energy of the closed macro-state/groups is quantified using the amount of interactions observed. The entropy is calculated as a measure of all possible micro-states/groups. Using these values the temperature and pressure of selected macro-state is calculated by comparing the change in energy and entropy over a period of time.

Table 1 lists the data from one such macro-state/groups with 723 connections gathered over a period of one month from interactions generated within these connections. They exhibit approximate linear increments in temperature and pressure with corresponding increase in energy which is plotted in FIG. 1.

TABLE 1 (a)

Various Thermodynamic Variables in action across time for Isochoric Heating Process

| Energy | Entropy | Change in Entropy |
|---|---|---|
| 2092.6 | 1621.2075 | |
| 2374.6 | 1731.60254 | 110.395 |
| 2631.8 | 1819.21564 | 87.6131 |
| 2721.8 | 1847.52559 | 28.30994 |
| 2971.6 | 1920.75794 | 73.23236 |
| 3037.4 | 1938.9053 | 18.14735 |
| 3129.8 | 1963.45951 | 24.55422 |
| 3203.2 | 1982.61775 | 19.15823 |
| 3340.2 | 2016.79129 | 34.17354 |
| 3408.6 | 2033.16812 | 16.3768 |

In an exemplary embodiment, referring to FIG. 1 is disclosed a graphical representation of the statistical data in table 1. The data is subdivided into 4 scenarios and compared with the live data. Scenario 1, 3 and 4 are the usual behavior of most of macro-states, with the significant increment in pressure with the increase in energy of the system. The first and third half of the graph shows drastic pressure increments with less than average increase in energy and the second half show the lower increments for higher energy values. This behavior when referenced with the live data shows that the scenario 2 is a period of extended weekend with low participation in the network. The first half starts along with a major influential initiating interaction causing a sudden surge in pressure value which attains equilibrium and second half has most of the interactions derived from this parent interaction and doesn't have any visible impact in pressure. The third part of the scenario marks the release of new features of the platform, exhibiting the effect of external pressure on the macro-state. Under the initial assumption, it is considered that users in the macro-state have no mass. The first phase of scenario 2 exhibits the impact of mass of the user in the system as interactions generated by heavy users exert more pressure. The model does show the relevant dips and highs based on the mass but will need a major remodeling to consider masses for defining other major equations. It is considered that there is a constant external pressure for the macro-state at any given time, but as evident from the phase 3 of scenario 2 the external force do effect the pressure in the macro-state and the algorithm needs to be tweaked for measuring and quantifying these impacts.

While modeling the socio-thermodynamic model and referencing it with live-data, the following observations are made:

Observation 1: The model assumes that there is negligible resistance to the information flow and every user acts as a perfect information dissipater in macro-state. The information diffusion though is highly dependent on the number of connections and increase in connections impacts the interaction patterns. With increase in volume in the system, accession of information diffusion becomes more apparent. This may be defined as lowering of diffusion threshold with increase in connections, which in social networks means more interest groups to share information by lowering resistance for information flow. The diffusion threshold is defined as the ratio of heat generated to the heat absorbed for a user. In other words, it's a ratio of interactions generated to interaction. It is also observed that Influencers have a very low value for diffusion threshold, proving it's inversely proportional to the mass of the user.

TABLE 1(b)

Change in temperature corresponding to pressure when pegged to entropy at cover for Isochoric Heating Process

| Change in Entropy | Change in energy | Temperature | Pressure |
|---|---|---|---|
| 110.395 | 282 | 2.554463 | 74.07943 |
| 87.6131 | 257.2 | 2.925634 | 85.13339 |
| 28.30994 | 90 | 3.179095 | 92.19376 |
| 73.23236 | 249.8 | 3.41106 | 98.92074 |
| 18.14735 | 65.8 | 3.625873 | 105.1503 |
| 24.55422 | 92.4 | 3.763101 | 109.1299 |
| 19.15823 | 73.4 | 3.831251 | 111.1063 |
| 34.17354 | 137 | 4.008949 | 116.2595 |
| 16.3768 | 68.4 | 4.176632 | 121.1223 |

Observation 2: Under the constraint of constant heat, introduction of a probable high mass, influential and frequent user, referred as influential will have an explosive effect in social thermodynamics. Assuming the small time interval after the influential joins, the macro-state acquires new connections in this very short span. As the interaction remains constant during this period, there is a rapid drop in entropy of the macro-state since the possible microstates system can be with the now reduced energy drops significantly.

The arrival of influential exerts an imploding force on other users, leads to a rapid expansion in connections. This sudden surge in connection reduces the overall pressure of the macro-state, stabilizing the system and marking a new equilibrium.

This is a hyper-expansion period for the macro-state in social network, new connections are made at a very high speed and there isn't enough data to keep the pressure and temperature constant at this stage causing a sudden drop in the temperature and overall pressure in the system. This scenario models the adiabatic expansion for socio-thermodynamic process.

TABLE 2 indicating entropy change with the change in volume.

| Increase in Volume | Change in Entropy |
| --- | --- |
| 2 | 23.5 |
| 3 | 32 |
| 1 | 10 |
| 3 | 28.4 |
| 5 | 42 |
| 2 | 15 |

In one exemplary embodiment, FIG. 2 shows the change in pressure of the macro-state with change in volume and Table 2 compares the entropy change with the change in volume. This means that the average interaction per connection has reduced for the considered time. So the low temperature and pressure is not due to lack of enough interaction but due to decrease in overall entropy of the system.

Thus, in accordance with an embodiment, the present invention enables execution of mapping and modeling of thermodynamic variable analysis on an enterprise social platform. In an embodiment, the impact of external impulse in the social system is observed in parallel and analysis is performed with real-data. The possible application and exploration areas to quantify individual influence and map diffusion patterns in social network are as follows:

1.) It can be implemented with any information flow network by varying only certain platform-specific variables.

2.) To build an information analysis tool for tracking information diffusion patterns based on change in temperature & pressure to optimize advertising campaigns, channeling/Routing cellular data, identifying influential users and pressure zones.

Although implementations for methods and systems for analyzing a social network have been described in language specific to structural features and/or methods, it is to be understood that the appended claims are not necessarily limited to the specific features or methods described. Rather, the specific features and methods are disclosed as examples of implementations for analyzing a social network.

We claim:

1. A method for analyzing a social network, the method comprising:
   segregating, by a processor, the social network into a plurality of groups of users, wherein each of the plurality of groups of users has a unique identity in the social network;
   mining data, by the processor, from at least one group of users of the plurality of groups of users;
   identifying a plurality of social variables from the data, wherein the plurality of social variables comprises at least one of: a number of users, connections of the users, interactions of the users, affinity of the users, and posts by the users;
   equating at least one social variable of the plurality of social variables with at least one thermodynamic variable of a plurality of thermodynamic variables, wherein the plurality of thermodynamic variables comprises at least one of: molecules, volume, internal energy, pressure, temperature, entropy, mass, viscosity, density, work, and bonding between molecules;
   determining quantitative values of the plurality of thermodynamic variables based upon the plurality of social variables, wherein the quantitative values are determined by controlling at least one thermal state; and
   generating a virtual thermodynamics system based upon the quantitative values for analyzing the social network, wherein the virtual thermodynamics system is analogous to the social network.

2. The method of claim 1, wherein the molecules are equated to the number of users, the volume is equated to the connections of the users, and the internal energy is equated to the interactions of the users.

3. The method of claim 1, further comprising:
   diffusing relevant information recursively in the at least one group of users based upon a behavior of the virtual thermodynamics system; and
   performing an influential analysis in the social network based upon the relevant information diffused recursively in the at least one group of users.

4. The method of claim 3, further comprising terminating a diffusion of the relevant information in the at least one group of users when a time period for the diffusion is expired.

5. The method of claim 3, wherein diffusing the relevant information further comprises at least one of: spreading advertising campaigns in the at least one group of users, channeling cellular data in the at least one group of users, spreading political and social movements in the at least one group of users, spreading news in the at least one group of users, and identifying pressure zones in the at least one group of users.

6. The method of claim 1, further comprising dynamically changing the quantitative value associated with the at least one thermodynamic variable based upon a change in the plurality of social variables.

7. The method of claim 1, wherein the at least one thermal state further comprises at least one of: adiabatic compression, isochoric heating, adiabatic cooling, and isochoric cooling.

8. A system for analyzing a social network, the system comprising
   a memory; and
   a processor coupled to the memory, the processor configured to execute programmed instructions stored in the memory to perform the steps of:
   segregating the social network into a plurality of groups of users, wherein each of the plurality of groups of users has a unique identity in the social network;
   mining data from at least one group of users of the plurality of groups of users;
   identifying a plurality of social variables from the data, wherein the plurality of social variables comprises at least one of: a number of users, connections of the users, interactions of the users, affinity of the users, and posts by the users;
   equating at least one social variable of the plurality of social variables with at least one thermodynamic variable of a plurality of thermodynamic variables, wherein the plurality of thermodynamic variables comprises at least one of: molecules, volume, internal energy, pressure, temperature, entropy, mass, viscosity, density, work, and bonding between molecules;
   determining quantitative values of the plurality of thermodynamic variables based upon the plurality of social variables, wherein the quantitative values are determined by controlling at least one thermal state; and generating a virtual thermodynamics system based upon the quantitative values for analyzing the social network, wherein the virtual thermodynamics system is analogous to the social network.

9. The system of claim 8, wherein the molecules are equated to the number of users, the volume is equated to the connections of the users, and the internal energy is equated to the interactions of the users.

10. The system of claim 8, further comprising:
diffusing relevant information recursively in the at least one group of users based upon a behavior of the virtual thermodynamics system; and
performing an influential analysis in the social network based upon the relevant information diffused recursively in the at least one group of users.

11. The system of claim 10, further comprising terminating a diffusion of the relevant information in the at least one group of users when a time period for the diffusion is expired.

12. The system of claim 10, wherein diffusing the relevant information further comprises at least one of spreading advertising campaigns in the at least one group of users, channeling cellular data in the at least one group of users, spreading political and social movements in the at least one group of users, spreading news in the at least one group of users, and identifying pressure zones in the at least one group of users.

13. The system of claim 8, further comprising dynamically changing the quantitative value associated with at least one thermodynamic variable based upon a change in the plurality of social variables.

14. The system of claim 8, wherein the at least one thermal state further comprises at least one of: adiabatic compression, isochoric heating, adiabatic cooling, and isochoric cooling.

15. A computer program product having embodied thereon a computer program for analyzing a social network, the computer program product comprising:
a memory and a processor executing a quantity of program code stored on the memory, wherein at least a portion of the program code is for:
segregating the social network into a plurality of groups of users, wherein each of the plurality of groups of users has a unique identity in the social network;
mining data from at least one group of users of the plurality of groups of users;
identifying a plurality of social variables from the data, wherein the plurality of social variables comprises at least one of: a number of users, connections of the users, interactions of the users, affinity of the users, and posts by the users;
equating at least one social variable of the plurality of social variables with at least one thermodynamic variable of a plurality of thermodynamic variables, wherein the plurality of thermodynamic variables comprises at least one of: molecules, volume, internal energy, pressure, temperature, entropy, mass, viscosity, density, work, and bonding between molecules;
determining quantitative values of the plurality of thermodynamic variables based upon the plurality of social variables, wherein the quantitative values are determined by controlling at least one thermal state; and
generating a virtual thermodynamics system based upon the quantitative values for analyzing the social network, wherein the virtual thermodynamics system is analogous to the social network.

\* \* \* \* \*